UNITED STATES PATENT OFFICE.

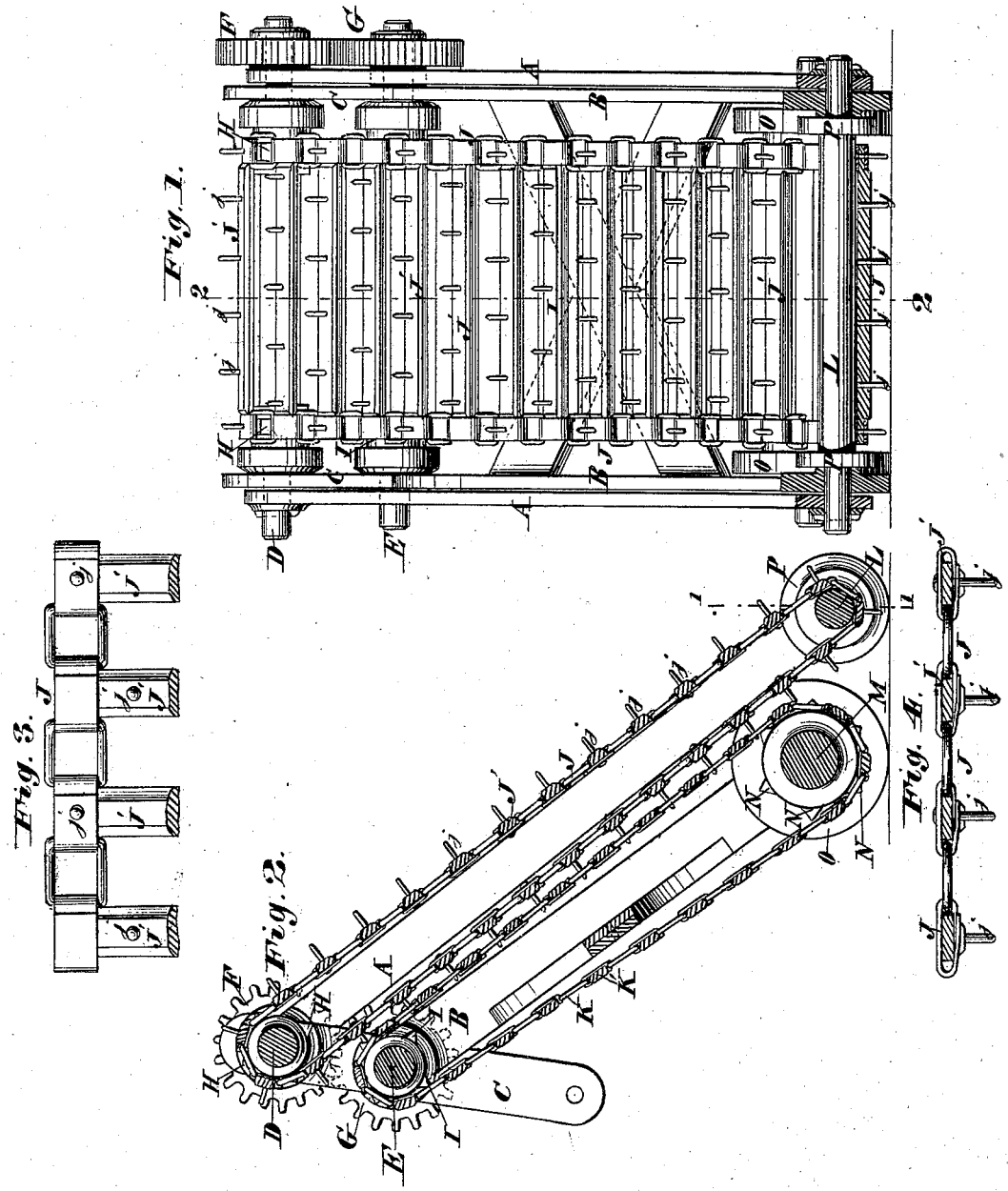

WILLIAM W. DEAN, OF MACON, ILLINOIS.

IMPROVEMENT IN HAY RAKER AND LOADER.

Specification forming part of Letters Patent No. 199,805, dated January 29, 1878; application filed November 2, 1876.

*To all whom it may concern:*

Be it known that I, WILLIAM W. DEAN, of Macon, in the county of Macon and State of Illinois, have invented a certain new and useful Improvement in Hay Rake and Loader, of which the following is a specification:

My hay rake and loader consists of two frames hinged together at top, and each carrying an endless apron of slats, which aprons are caused to rotate in unison, the upper or outer apron being provided with teeth, which rake the hay and carry it up between the two aprons, as hereinafter described.

In the accompanying drawings, Figure 1 is a rear elevation, partly in section on the line 1 1, Fig. 2. Fig. 2 is a vertical section on the line 2 2, Fig. 1. Fig. 3 is a plan of a portion of one of the aprons detached, on a larger scale. Fig. 4 is a section of the same.

A B are a pair of frames, pivoted at their upper ends to a connecting-frame, C, by which the implement is to be attached to the tail of a hay-wagon by means of a suitable bail or links or other means. The shafts D E, by which the respective frames A B are pivoted to the connecting-frame C, extend completely through from side to side, and have keyed on them pinions F G, which mesh together, so that the two shafts will be caused to rotate in unison, while the frames A B are permitted free vertical and relative motion on their axes D E. The shafts D E are also provided with sprocket wheels or teeth H I, carrying endless chains, which are connected by slats J' and K', respectively. J J' and K K' thus form endless aprons, which are stretched by shafts L M at the lower extremities of the respective frames A B. Upon the shaft M are sprocket wheels or teeth N, engaging with the endless chains K, and on the same shaft are keyed driving-wheels O. The shaft L runs loosely in carrying-wheels P. The slats J' are provided with teeth *j*, of such length as to nearly reach the ground when passing around the shaft L at their lowest position.

One or both of the driving-wheels O O are, in practice, connected to their shaft M through the medium of pawls and ratchet-wheels, and are adapted to be thrown in and out of gear in a manner commonly practiced with harvesters and other agricultural implements, so as to permit the machine to be turned freely, and, when desired, to be moved from place to place without driving, raking, and elevating aprons.

Operation: The frame C being attached to the rear of a hay-wagon by any approved means, the wheels O and P will rest on the ground, and the frames A B, being allowed independent movement on their centers on the frame C, will permit the said wheels to accommodate themselves to undulations or inequalities in the ground, causing the driving-wheels O always to bear on the ground, and the teeth *j* always to be carried close to the ground in turning around the lower shaft L. The wagon being drawn forward, the rotation of the driving-wheels O is communicated, through the sprocket-teeth N, to the endless apron K K'. This, through the medium of sprocket-teeth I, turns the shaft E and pinion G, gearing with the pinion F on the shaft D, and, by the sprocket-teeth H, driving the endless apron J J' in the opposite direction, so that the meeting-faces of the two endless aprons will pass upward in unison, the rake *j* being carried over the surface of the ground, so as to gather the hay and convey it to the space between the aprons, by which it is carried upward and deposited on the wagon.

I claim—

1. The upper or outer endless revolving apron, carrying the gathering or raking teeth, and mounted in a frame pivoted to the attaching-frame, so as to conform to the surface of the ground, in combination with an under or inner endless revolving apron, coacting with the raking-apron to elevate the hay, as described.

2. The two frames A B, independently pivoted upon the connecting-frame at top and disconnected at bottom, so as to conform independently to inequalities in the surface of the ground, while carrying the aprons J J' and K K', respectively, as and for the purpose set forth.

W. W. DEAN.

Witnesses:
OCTAVIUS KNIGHT,
LE BLOND BURDETT.